April 13, 1965 R. S. GRAHAM 3,178,698
REGULATOR ALARM CIRCUIT
Filed Sept. 14, 1960
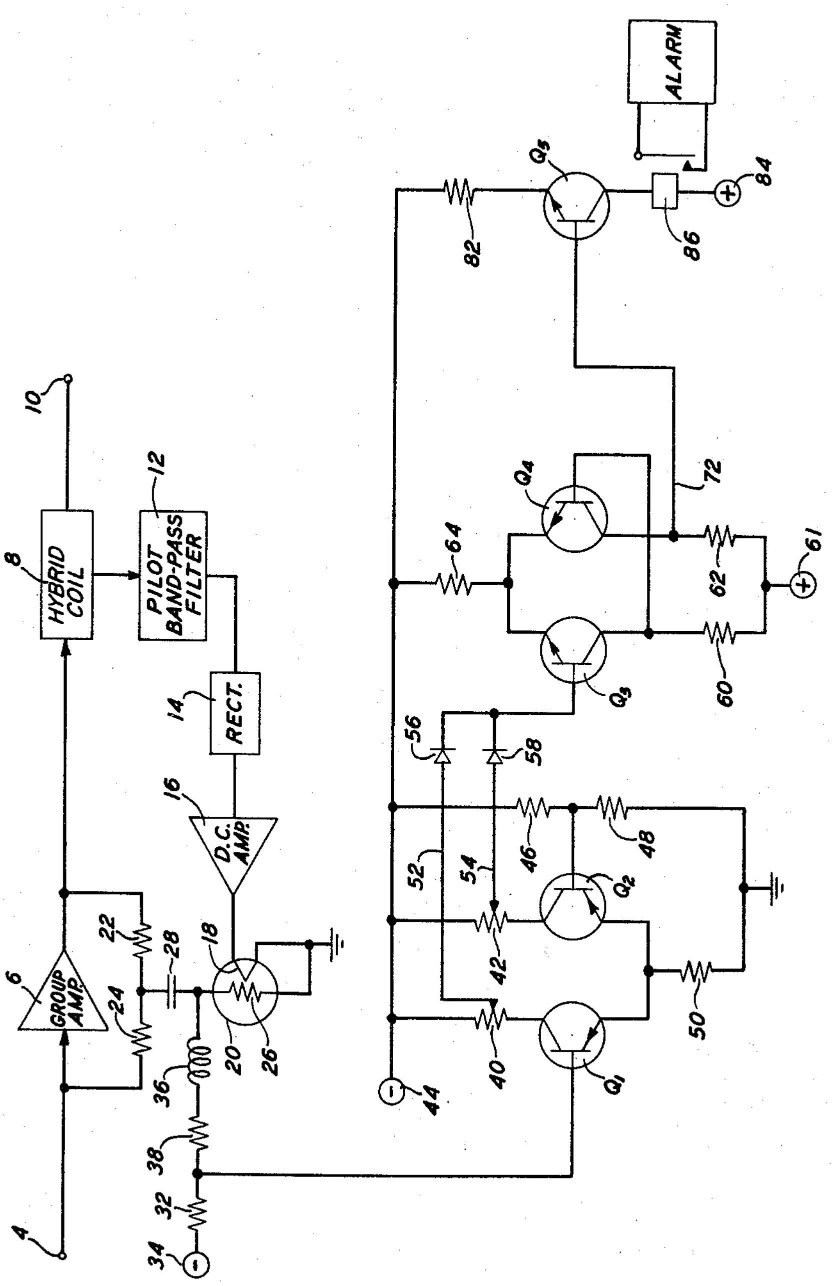
INVENTOR
R. S. GRAHAM
BY R. B. Ardis
ATTORNEY

United States Patent Office 3,178,698

Patented Apr. 13, 1965

3,178,698

REGULATOR ALARM CIRCUIT

Robert S. Graham, Boxford, Mass., assignor to Bell Telephone Laboratories, Incorporated, New York, N.Y., a corporation of New York Filed Sept. 14, 1960, Ser. No. 55,936
6 Claims. (Cl. 340—248)

This invention relates to supervisory alarm circuits and, more particularly, to alarm circuits capable of monitoring the operation of amplifiers whose gain is regulated by one or more thermistors.

In order to regulate an amplifier so that the amplitude of the output is substantially constant over a wide range of input amplitudes, a thermistor is often used in the feedback circuit of the amplifier as a gain controlling element. The thermistor, a resistance having a high temperature coefficient, when heated such that its temperature is dependent on some parameter of output amplitude, is capable of altering the feedback characteristics of the amplifier in such a manner that substantially constant signal amplitude is produced at the output. Such a regulated amplifier is well known and is taught in United States Patent 2,293,750 issued on August 25, 1942 to F. A. Leibe.

Prior to this invention the usual means of monitoring the operation of a thermistor regulated amplifier was an arrangement which applied a portion of the output signal to a threshold device arranged to trigger an alarm circuit whenever the output signal amplitude departed by some preset amount from the desired output amplitude.

While such an alarm is capable of notifying the operating personnel whenever the output amplitude is outside the acceptable operating range, the device has several inherent disadvantages. Because the output amplitude of an amplifier regulated in this manner is substantially constant over a wide range of input amplitudes, the gain of the amplifier may vary over a wide range. Since unusually large or small values of amplifier gain may reduce the fidelity of the output signal, it is desired to limit this gain to a previously determined acceptable operating range. A prior alarm circuit such as that previously discussed is not capable of indicating the unusually high or low gain encountered when the amplifier approaches the limits of its operating range as long as the output amplitude remains relatively unchanged.

It is therefore, an object of this invention to insure that the gain of a thermistor controlled regulator lies between two limiting values.

In some thermistor regulated amplifiers, the limiting values which form the boundaries of the acceptable operating range may not be determined by gain considerations but by the thermistor's ability to regulate the gain so that the output ampltiude remains substantially constant. Even though the prior alarm circuit may be arranged to actuate the alarm whenever the output amplitude departs significantly from the desired level, it is incapable of detecting the trouble condition before it occurs.

It is, therefore, a further object of this invention to inform operating personnel whenever a regulated amplifier is approaching the end of its operating range.

The present invention takes the form of an arrangement for monitoring the resistance of the gain-controlling thermistor rather than the output level of the thermistor controlled amplifier. In this manner, the actual gain of the amplifier is monitored and a warning is given before, rather than after, the thermistor regulator reaches the end of its desired operating range.

In accordance with a principal feature of the invention, current having a frequency which is outside of the frequency band of the signals being amplified by the regulated amplifier is passed through the thermistor to derive a voltage proportional to the thermistor resistance and an alarm is actuated whenever that voltage rises above or drops below predetermined levels. These levels can be preset independently of one another to encompass the desired operating resistance range for the thermistor.

A more complete understanding of the invention may be obtained by studying the following detailed description of a specific embodiment of the invention.

The single figure of the drawing illustrates a pilot controlled gain regulator embodying the invention.

The specific embodiment of the invention illustrated in the drawing is an alarm circuit used in connection with a pilot controlled gain-regulated amplifier. Such a regulator is used to insure that the amplitude of the signal group at the output terminal is substantially constant regardless of input intensity. This signal group contains a pilot signal, which is usually an unmodulated signal of constant amplitude, along with a plurality of information carrying signals at different frequencies. This incoming signal group is applied to the inpul terminal 4 of a group amplifier 6. The output of the group amplifier 6 is connected to the transmitting or output terminal 10 through a hybrid coil 8. A pilot bandpass filter 12 is connected to the hybrid coil 8 such that it will receive the pilot signal from the amplifier output and its output connected in turn to a rectifier 14. The output signal from rectifier 14 is passed through a direct current amplifier 16 and the heating element 18 of a thermistor 20 to ground. A pair of series resistances 22 and 24 and the shunt resistance 26 of thermistor 20 make up a negative feedback "T" network connected between the input and output terminals of group amplifier 6.

A regulated amplifier of this type utilizes the intensity of the pilot signal at the output of the amplifier to control the resistance of the thermistor in the feedback circuit. This is done by removing a small portion of the pilot signal from the hybrid coil, separating it from the information carrying signals in the bandpass filter, rectifying and amplifying the separated signal such that a current whose magnitude is directly related to the amplitude of the pilot signal at the amplifier's output is passed through the heating element of the thermistor. In this manner an increase in the intensity of the pilot signal at the output causes a corresponding decrease in the resistance of the thermistor thereby changing the characteristics of the feedback circuit such that the gain of the amplifier is reduced.

In accordance with the invention a negative voltage is applied to terminal 34 from which a direct current path is provided through a pair of resistances 32 and 38, an inductance 36, and thermistor resistance 26 in series to ground. A blocking capacitor 28 is connected to provide a signal frequency alternating current path from the juncture of resistances 24 and 22 through thermistor resistance 26 to ground. Inductance 36, on the other hand, provides a direct current path from terminal 34 through resistances 32, 38 and thermistor resistance 26 to ground. However, the two distinct paths through thermistor resistance 26 are separated from one another in the sense that alternating current is not allowed to flow in the direct current path and vice versa. A voltage is consequently developed at the juncture of resistances 32 and 38 which is directly related to the value of thermistor resistance 26. A circuit path is provided from the juncture of resistances 32 and 38 to the base electrode of a transistor $Q_1$. Transistors $Q_1$ and $Q_2$ along with resistances 40, 42, 46, 48 and 50 and the interconnections thereof make up a common type of differential amplifier. The collector electrodes of transistors $Q_1$ and $Q_2$ are connected through resistances 40 and 42, respectively, to terminal 44 which supplies a negative operating potential. A voltage dividing network made up of resistances 46 and 48 in series is connected between terminal 44 and ground. The base electrode of transistor $Q_2$ is connected to the juncture of resistances 46 and 48. The emitter electrodes of transistors $Q_1$ and $Q_2$ are connected together and resistance 50 is connected between their juncture and ground. Output conductors 52 and 54 are connected to variable taps on resistances 40 and 42, respectively. The position of the tap on resistance 40 determines the maximum limit of voltage existing at the juncture of resistances 32 and 38 which will not trigger the alarm while the tap on resistance 42 determines the minimum limit.

The operation of such a differential amplifier is well known and provides a push-pull output, the voltage on each output conductor of which is in phase opposition to the other. An increasing voltage at the base electrode of $Q_1$ results in an increasing voltage on output conductor 52 and a decreasing voltage on output conductor 54.

Output conductor 52 is connected to the base electrode of a transistor $Q_3$ through a diode 56. Output conductor 54 is connected to the base electrode of a transistor $Q_3$ through a diode 58. Diodes 58 and 56 make up a common OR gate which isolates the differential amplifier from the loading effects of transistor $Q_3$.

Transistors $Q_3$ and $Q_4$ in combination with resistances 60, 62 and 64 and the interconnections thereof make up a trigger circuit well known to the art. The emitter electrodes of transistors $Q_3$ and $Q_4$ are connected together. Resistance 64 connects the juncture of the emitter electrodes of transistors $Q_3$ and $Q_4$ to terminal 44 which supplies the negative operating potential. The collector electrode of transistor $Q_3$ is connected to positive supply terminal 61 by resistance 60. The collector electrode of transistor $Q_4$ is connected to terminal 61 by resistance 62. A short-circuit path connects the collector electrode of transistor $Q_3$ with the base electrode of transistor $Q_4$. Output conductor 72 of the trigger circuit connects the juncture of resistance 62 and the collector electrode of transistor $Q_4$. Output conductor 72 is connected to the base electrode of transistor $Q_5$.

The operation of this trigger circuit is such that when the magnitude of the input voltage rises above a predetermined threshold value, an output voltage is applied to the output conductor. Means to preset the limiting values of the voltage at the juncture of resistances 32 and 38 which, when passed through the differential amplifier, will trigger this threshold device is provided by the variable taps on resistances 40 and 42.

The emitter electrode of transistor $Q_5$ is connected to positive terminal 84 through the solenoid of a relay 86. Relay 86 is then used to annunciate an audible or visual alarm which notifies the operating personnel of the trouble condition.

The specific embodiment of the invention as described is capable of insuring that the thermistor resistance, and hence the gain of the amplifier, lies within an acceptable operating range. This operating range is bounded by two limiting values which, by selecting the desired positions of the taps on resistances 40 and 42, may be independently preset.

It is to be understood that the particular embodiment described is illustrative of the application of the principles of the invention. These principles may be applied advantageously to other electrical devices whose operation is controlled by an impedance element, the magnitude of whose impedance is automatically varied in accordance with some parameter of operation. Furthermore, it is obvious to those skilled in the art that variation in particular portions of the circuitry may be substituted without departing from the spirit and scope of the invention.

What is claimed is:

1. In combination, an amplifier which includes a thermistor, the magnitude of the resistance of said thermistor being a parameter of the gain of said amplifier, automatic gain control means for altering the resistance of said thermistor in response to fluctuations in the magnitude of the input signal delivered to said amplifier, a source of a first unidirectional voltage of substantially constant magnitude, circuit means for passing a curent from said source through said thermistor to develop a second unidirectional voltage across said thermistor, the magnitude of said second voltage being directly related to the magnitude of the resistance of said thermistor, an alarm device, and means responsive to said second voltage for actuating said alarm device whenever the magnitude of said second voltage lies outside a predetermined range of values.

2. An arrangement as set forth in claim 1 characterized in that said circuit means for passing a current through said thermistor includes at least one reactive element for preventing the gain of said amplifier from being dependent upon the magnitude of said current.

3. In combination, an amplifier which inludes a thermistor, the magnitude of the resistance of said thermistor being a parameter of the gain of said amplifier, automatic gain control means for altering the resistance of said thermistor in response to fluctions in the magnitude of the input signal delivered to said amplifier, a source of a direct-current voltage, a fixed resistance, circuit means for serially connecting said fixed resistance and said thermistor across said source, said last named circuit means including a reactive element for preventing the gain of said amplifier from being dependent upon the magnitude of current flowing from said source through said thermistor, said circuit means being characterized in that the voltage across said thermistor is directly related to the resistance of said thermistor, and a trigger circuit responsive to the voltage across said thermistor for annunciating an alarm signal whenever said voltage across said thermistor exceeds a predetermined value.

4. In combination, an amplifier which includes a thermistor, the magnitude of the resistance of said thermistor being a parameter of the gain of said amplifier, automatic gain control means for altering the resistance of said thermistor in response to fluctions in the magnitude of the input signal delivered to said amplifier, a source of a substantially constant unidirectional current, means for passing said current through said thermistor to develop a first voltage whose magnitude is substantially proportional to the resistance of said thermistor, means responsive to said first voltage for generating second and third voltages, the magnitude of said second voltage being directly related to the magnitude of said first voltage and the magnitude of said third voltage being inversely related to the magnitude of said first voltage, and a threshold device responsive to said second and said third voltages for annunciating an alarm signal whenever the magnitude of said second voltage rises above a first predetermined value and for annunciating said alarm signal whenever the magnitude of said third voltage rises above a second predetermined value.

5. In combination, an amplifier having an input and an output, a source of signals falling within a predetermined frequency range, means for applying said signals to said amplifier input, a first circuit path for connecting a thermistor in said amplifier for controlling the gain of said amplifier, said first circuit path being conductive for signals falling within said predetermined frequency range and nonconductive for direct-current signals, means responsive to fluctuations in the magnitude of one of said signals for varying the resistance of said thermistor, a source of a first direct-current voltage, a second circuit path for passing current from said source of direct-current voltage through said thermistor to develop a second direct-current voltage across said thermistor, the magnitude of said second direct-current voltage being directly related to the magnitude of the resistance of said thermistor, said second circuit path being conductive for direct-current signals but nonconductive for alternating-current signals, an alarm, and means responsive to said second direct-current voltage for actuating said alarm whenever said second direct-current voltage lies outside a predetermined range.

6. A combination as set forth in claim 5 wherein said first circuit means includes a capacitor serially connected therewith, and said second circuit means includes an inductor serially connected therewith.

References Cited by the Examiner

UNITED STATES PATENTS

| | | | |
|---|---|---|---|
| 2,154,888 | 4/39 | Black | 333—16 |
| 2,575,358 | 11/51 | Nuckolls | 340—248 |
| 2,902,548 | 9/59 | Moeller | 330—143 |
| 2,921,267 | 1/60 | Thomas | 330—52 |
| 2,956,268 | 10/60 | Kline | 340—248 |

FOREIGN PATENTS

| | | |
|---|---|---|
| 211,430 | 4/56 | Australia. |

NEIL C. READ, *Primary Examiner.*

E. JAMES SAX, NATHAN KAUFMAN, *Examiners.*